(12) United States Patent
Sugaya

(10) Patent No.: US 10,880,476 B1
(45) Date of Patent: Dec. 29, 2020

(54) LONG IMAGE GENERATION SYSTEM, METHOD AND PROGRAM

(71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 0 days.

(21) Appl. No.: 16/759,882

(22) PCT Filed: Oct. 30, 2017

(86) PCT No.: PCT/JP2017/039121
§ 371 (c)(1),
(2) Date: Aug. 14, 2020

(87) PCT Pub. No.: WO2019/087247
PCT Pub. Date: May 9, 2019

(51) Int. Cl.
*B64D 47/08* (2006.01)
*H04N 5/232* (2006.01)
*H04N 5/76* (2006.01)
*B64C 39/02* (2006.01)

(52) U.S. Cl.
CPC ......... *H04N 5/23238* (2013.01); *B64D 47/08* (2013.01); *H04N 5/76* (2013.01); *B64C 39/024* (2013.01); *B64C 2201/127* (2013.01)

(58) Field of Classification Search
None
See application file for complete search history.

(56) References Cited

U.S. PATENT DOCUMENTS

| | | | |
|---|---|---|---|
| 2007/0139523 A1* | 6/2007 | Nishida | H04N 7/181 348/148 |
| 2013/0135440 A1* | 5/2013 | Ohtomo | G01C 11/06 348/46 |
| 2016/0198088 A1* | 7/2016 | Wang | H04N 5/77 348/36 |

FOREIGN PATENT DOCUMENTS

| | | |
|---|---|---|
| JP | 2012-209775 A | 10/2012 |
| JP | 2013-108927 A | 6/2013 |
| JP | 2014-215304 A | 11/2014 |
| JP | 2017-005353 A | 1/2017 |
| JP | 2017-513245 A | 5/2017 |
| JP | 2017-118386 A | 6/2017 |
| WO | 2017/130700 A1 | 8/2017 |

OTHER PUBLICATIONS

International Search Report issued in PCT/JP2017/039121 dated Dec. 26, 2017.

* cited by examiner

*Primary Examiner* — Eileen M Adams
(74) *Attorney, Agent, or Firm* — Norton Rose Fulbright US LLP; James R. Crawford

(57) ABSTRACT

Provided is a long image generation system. In the long image generation system, even when the moving vehicle and an imaging object are separated by a predetermined distance or more, a continuous long image can be generated through obtaining as few images as possible. The long image generation system (1) of the present disclosure includes: a moving vehicle carrying an imaging device; and a computer (30). The control unit (32) of the computer (30) obtains images at time intervals that changes in accordance with the view angle of the imaging device and the moving speed of the moving vehicle, records the images in the image data storage region (332), and synthesizes the images stored in (Continued)

the image data storage region (332) to generate the long image.

5 Claims, 6 Drawing Sheets

(a) The change of the time interval in a case where the view angle and the moving speed are fixed and the flight altitude is changed

| View angle of capturing 80° | | | | |
|---|---|---|---|---|
| Flight altitude | 1 m | 5 m | 10 m | 20 m |
| Moving speed | 5 km/h | 5 km/h | 5 km/h | 5 km/h |
| Time interval | 0.5 s | 1.2 s | 5 s | 8 s |

(b) The change of the time interval in a case where the view angle and the flight altitude are fixed and the moving speed is changed

| View angle of capturing 80° | | | | |
|---|---|---|---|---|
| Flight altitude | 5 m | 5 m | 5 m | 5 m |
| Moving speed | 20 km/h | 15 km/h | 10 km/h | 1 km/h |
| Time interval | 0.4 s | 1.3 s | 5.2 s | 8.1 s |

(c) The change of the time interval in a case where the flight altitude and the moving speed are the same as FIG. 3(a) and only the view angle is changed

| View angle of capturing 100° | | | | |
|---|---|---|---|---|
| Flight altitude | 1 m | 5 m | 10 m | 20 m |
| Moving speed | 5 km/h | 5 km/h | 5 km/h | 5 km/h |
| Time interval | 0.7 s | 1.4 s | 5.3 s | 8.5 s |

FIG. 3

Moving direction of a flight vehicle 10

Moving direction of a flight vehicle 10

LONG IMAGE GENERATION SYSTEM, METHOD AND PROGRAM

CROSS-REFERENCE TO RELATED APPLICATIONS

This application is a national phase under 35 U.S.C. § 371 of International Application No. PCT/JP2017/039121 filed Oct. 30, 2017, the entire contents of which is incorporated herein by reference in its entirety.

TECHNICAL FIELD

The present disclosure relates to a long image generation system, method and program.

BACKGROUND

In the past, a long image generation system including an imaging device, a moving vehicle carrying the imaging device and a computer exists. In the long image generation system, multiple images captured by the imaging device are overlapped end-to-end to generate a long image.

Based on this long image generation system, a system described below is proposed. In the system, when an unmanned aerial vehicle is hovering near a predetermined position, a support mechanism rotates an image obtaining device about a first axis, and on the other hand, stabilizes the image obtaining device relative to at least a second axis; the image obtaining device, when rotated, acquires repeated images to generate a panoramic image (referring to patent document 1). According to the system described in patent document 1, it is possible to generate a panoramic image without sending multiple images to a remote device.

In addition, an image obtaining system is proposed. The image obtaining system includes an illumination unit and an imaging unit. The illumination unit illuminates an object with light to form a predetermined pattern to the surface of the object. The imaging unit divides the surface of the object provided with the predetermined pattern into multiple places for capturing (referring to patent document 2). According to the system described in patent document 2, it is possible to provide an image obtaining system capable of obtaining multiple images that are easily combined.

However, the system described in the patent document 1 is based on the following premise: the unmanned aerial vehicle hovers at a predetermined position, and the image obtaining device rotates about the first axis and obtains an omnidirectional panoramic image. For example, in a case where the unmanned aerial vehicle moves linearly in a certain direction, it is unclear the minimal quantity of images to be prepared for generating a continuous long image, and thus a large number of images may be wastefully prepared, or the prepared images may be insufficient for generating the continuous long image.

In addition, the system described in the patent document 2 is based on the premise of illuminating the object. When the imaging unit is far away from the object, the system described in patent document 2 cannot be adopted.

DOCUMENTS OF THE RELATED ART

Patent Documents

Patent document 1: Japanese patent publication No. 2017-513245

Patent document 2: Japanese patent publication No. 2017-118386.

SUMMARY

The present disclosure aims to provide a long image generation system, method and program, which, even when a moving vehicle moves linearly in a certain direction and the moving vehicle and an imaging object are separated by a predetermined distance or more, can generate a continuous long image through obtaining as few images as possible.

A first embodiment of the present disclosure provides a long image generation system. The long image generation system includes an imaging device, a moving vehicle carrying the imaging device and a computer, and the long image generation system is capable of synthesizing a plurality of images captured by the imaging device with movement of the moving vehicle to obtain a long image.

The computer includes an image storage unit and a long image generation unit.

The image storage unit is configured to obtain the plurality of images at time intervals and store the plurality of images, where the time intervals change according to a view angle of the imaging device and a moving speed of the moving vehicle.

The long image generation unit is configured to synthesize the plurality of images stored in the image storage unit to generate a long image.

According to the first embodiment of the present disclosure, the image storage unit is configured to obtain the plurality of images at time intervals and store the plurality of images, where the time intervals change according to the view angle of the imaging device carried by the moving vehicle and the moving speed of the moving vehicle. The long image generation unit is configured to synthesize the plurality of images stored in the image storage unit to generate a long image. The time intervals for obtaining the plurality of images can be appropriately adjusted according to the view angle of the imaging device carried by the moving vehicle and the moving speed of the moving vehicle. Even when the moving vehicle moves linearly in a certain direction, and the moving vehicle and an imaging object are separated by a predetermined distance or more, a continuous long image can be generated through obtaining as few images as possible.

On the basis of the first embodiment of the present disclosure, a second embodiment of the present disclosure provides an image generation system.

The moving vehicle is a flight vehicle.

The image storage unit is configured to obtain the plurality of images at the time intervals, where the time intervals change according to the view angle of the imaging device, the moving speed of the flight vehicle, and altitude of the flight vehicle.

According to the second embodiment of the present disclosure, the moving vehicle is the flight vehicle, even when the flight vehicle moves linearly in a certain direction, and the flight vehicle and the imaging object are separated by a predetermined distance or more, a continuous long image can be generated through obtaining as few images as possible.

On the basis of the first embodiment and the second embodiment of the present disclosure, a third embodiment of the present disclosure provides an image generation system.

The computer further includes an information storage unit, a time interval setting unit and a shutter updating unit.

The information storage unit is configured to pre-store information indicating a relationship of the time intervals to the view angle of the imaging device and to the moving speed of the moving vehicle.

The time interval setting unit is configured to set the time intervals corresponding to the view angle of the imaging device and the moving speed of the moving vehicle based on the information stored in the information storage unit.

The shutter updating unit is configured to, according to the time intervals set by the time interval setting unit, set a shutter of the imaging device from a closed state to an open state, and set the shutter from the open state to the closed state after a predetermined period.

The image storage unit is configured to obtain the plurality of images obtained when the shutter is in the open state and store the plurality of images.

According to the third embodiment of the present disclosure, the time intervals for setting the shutter to the open state and obtaining the plurality of images can be appropriately adjusted according to the information stored in the information storage unit. Therefore, even when the moving vehicle moves linearly in a certain direction, and the moving vehicle and the imaging object are separated by a predetermined distance or more, a continuous long image can be generated through obtaining a further fewer images.

On the basis of the first embodiment and the second embodiment of the present disclosure, a fourth embodiment of the present disclosure provides an image generation system.

The imaging device is configured to capture a first image at first timing and capture a second image at second timing later than the first timing.

The computer further includes: a determination unit, which is configured to determine whether an overlapping degree of a front image occupying a predetermined region in a movement direction of the first image and a rear image occupying a predetermined region in a direction opposite to the movement direction of the second image is equal to or greater than a predetermined degree.

In a case where the determination unit determines that the overlapping degree is equal to or greater than the predetermined degree, the image storage unit is configured to at least accumulatively store the second image; where the second image is taken as the first image, capturing of the second image and determination are repeated.

In a case where the determination unit determines that the overlapping degree is less than the predetermined degree, the second image is captured again and determination of the determination unit is performed again.

According to the fourth embodiment of the present disclosure, only in a case where an overlapping degree of a front image occupying a predetermined region in a movement direction of the first image and a rear image occupying a predetermined region in a direction opposite to the movement direction of the second image is greater than the predetermined degree, the image is stored in the image storage unit. Therefore, even when the moving vehicle moves linearly in a certain direction, and the moving vehicle and the imaging object are separated by a predetermined distance or more, a continuous long image can be generated through obtaining further fewer images.

BRIEF DESCRIPTION OF THE DRAWINGS

FIG. 3 is a chart showing an example of a relationship of the view angle, the moving speed and the flying altitude with the capturing time interval of a camera in a case where the moving vehicle is a flight vehicle.

DETAILED DESCRIPTION

Hereinafter, embodiments of the present disclosure will be described in conjunction with the drawings. It should be noted that this is merely an example, and the technology scope of the present disclosure is not limited thereto.

Composition of a Long Image Forming System 1 According to a First Embodiment

Figure 1:
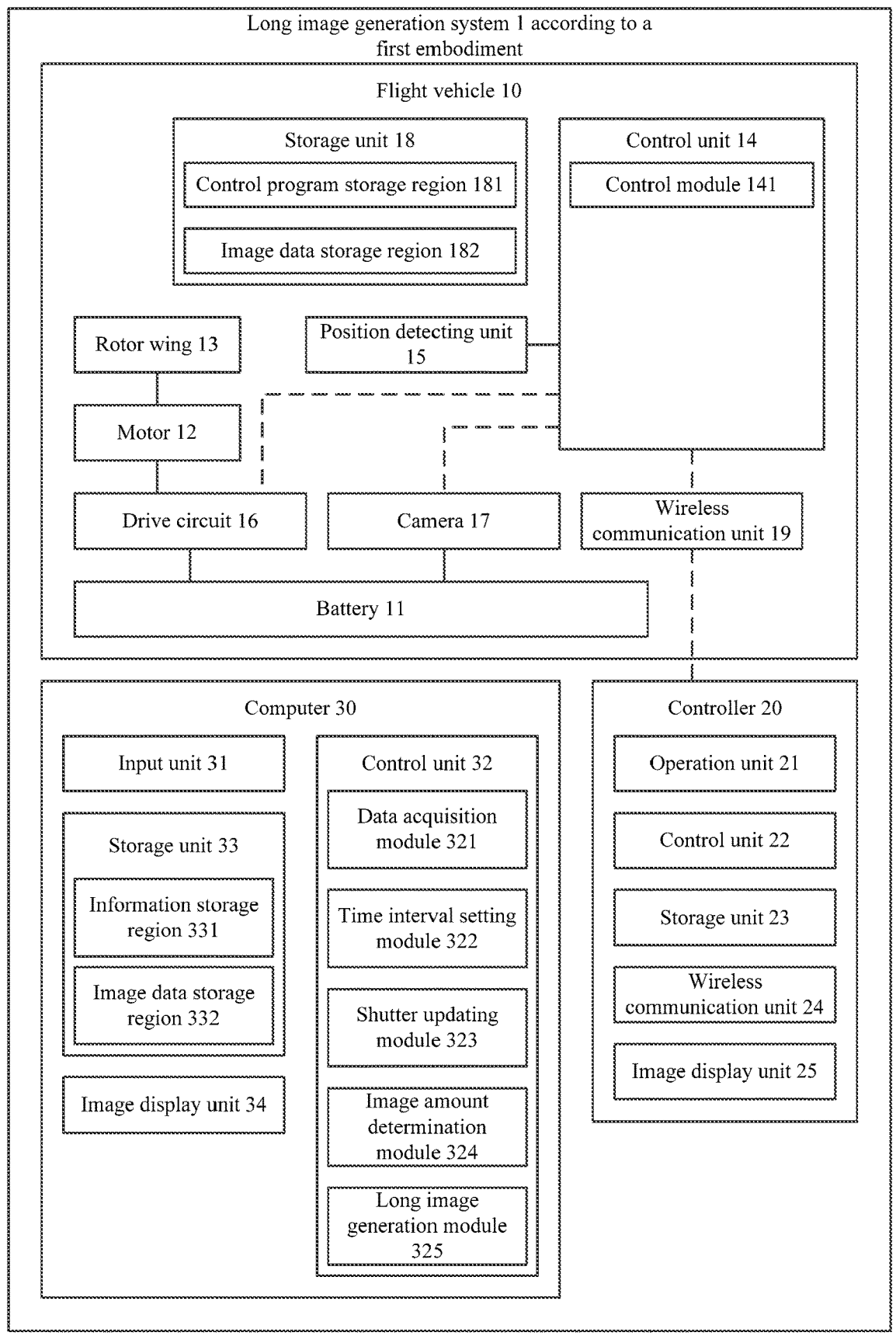
FIG. 1 is a block diagram of a hardware configuration and software functions of a long image generation system 1 based on a moving vehicle according to a first embodiment.

FIG. 1 is a block diagram of a hardware configuration and software functions of a long image generation system 1 based on a moving vehicle according to a first embodiment. The long image generation system 1 includes: a flight vehicle 10, which is used for a moving vehicle in the embodiment of the present disclosure; a camera 17, which is used for an imaging device in the embodiment of the present disclosure and carried by the flight vehicle 10; a controller 20, which is connected to the flight vehicle 10 in a wireless communication manner and configured to manipulated the flight vehicle 10; and a computer 30, which is used for editing the image captured by the camera 17. It should be noted that in the present embodiment, the flight vehicle 10 can be appropriately automatically manipulated. When the flight vehicle 10 is automatically manipulated, the controller 20 may not be provided. Furthermore, in the present embodiment, the flight vehicle 10 is described as an example of the moving vehicle, but the moving vehicle may also be a moving vehicle moving on the ground.

Flight Vehicle 10

The flight vehicle 10 is not particularly limited as long as it can photograph an object from the air. For example, the vehicle may be a radio-controlled aircraft or an unmanned flight vehicle called a drone, or a manned aircraft. The following description deals with a case where the flight vehicle 10 is an unmanned aircraft.

The flight vehicle 10 includes: a rotor wing 13, which is used for rising and flying the flight vehicle 10; a motor 12 (not shown), which is used for rotating the rotor wing 13; and a battery 11 (not shown), which is used as a power supply of the flight vehicle 10 and is used for supplying electric power to the motor 12. In addition, the flight vehicle 10 also includes a camera 17 for capturing an image.

The flight vehicle 10 further includes: a control unit 14, which is used for controlling the action of the flight vehicle 10; a position detecting unit 15, which is used for transmitting position information of the flight vehicle 10 to the control unit 14; a drive circuit 16, which is used for driving the motor 12 according to a control signal from the control unit 14; a camera 17, which is used for performing aerial photography of the to-be-captured object according to the control signal from the control unit 14; and a storage unit 18, which is used for pre-storing a control program and the like executed by a microcomputer of the control unit 14, and storing an image captured by the camera 17.

Furthermore, the flight vehicle 10 includes: a wireless communication unit 19, which is used for wireless communication with the controller 20.

These components are mounted on a main body structure (frame or the like) having a predetermined shape. The main body structure (frame or the like) having a predetermined shape may be the same as the structure of a known drone.

Battery 11

The battery 11 is a primary battery or a secondary battery for supplying electric power to the components in the flight vehicle 10. The battery 11 may be fixed to the flight vehicle 10 or may be detachable.

Motor 12/Rotor Wing 13

The motor 12 is used as a drive source for rotating the rotor wing 13 with electric power supplied from the battery 11. By means of rotation of the rotor wing 13, the flight vehicle 10 can rise and fly.

Control Unit 14

The control unit 14 includes a central processing unit (CPU), random access memory (RAM), read only memory (ROM), and the like.

In addition, the control unit 14 implements the control module 141 by reading a predetermined program.

The control unit 14 controls the motor 12 to perform flight control (e.g., ascent, descent, horizontal movement, and the like) of the flight vehicle 10. In addition, the control unit 14 uses a gyroscope (not shown) carried on the flight vehicle 10 to control the motor 12 to perform attitude control of the flight vehicle 10.

Position Detecting Unit

The position detecting unit 15 is configured to include the laser imaging detection and ranging (LIDAR) technology and the global positioning system (GPS) technology. The LIDAR and GPS technologies are used together to detect the latitude, longitude, and altitude of the actual flight position of the flight vehicle 10.

Drive Circuit 16

The drive circuit 16 has a function of applying a voltage specified by a control signal from the control unit 14 to the motor 12. Thus, the drive circuit 16 can drive the motor 12 according to the control signal from the control unit 14.

Camera 17

The camera 17 functions as an imaging device. The camera 17 converts (images) the optical image taken in by the lens into an image signal by an imaging element such as a charge coupled device (CCD), a complementary metal oxide semiconductor (CMOS), or the like. The type of the camera 17 may be appropriately selected according to the image parsing method of the imaging object.

Storage Unit 18

The storage unit 18 is a device for storing data and files, and includes a data storage unit based on a hard disk or a semiconductor memory, recording medium, a memory card, or the like. The storage unit 18 includes: a control program storage region 181, which is used for pre-storing a control program executed by the microcomputer of the control unit 14 and the like; and an image data storage region 182, which is used for storing the image data captured by the camera 17 and the three-dimensional coordinate data (data of the latitude, longitude, and altitude of the point corresponding to the capturing position of the image captured by the camera 17) detected by the positioning detecting unit 15 together.

It should be noted that the image constituting the image data may be a static image or a dynamic image. In addition, the data stored in the image data storage region can be transferred to the computer 30 through a portable recording medium such as a universal serial bus (USB) memory, a secure digital memory (SD) card and the like.

Wireless Communication Unit 19

The wireless communication unit 19 is configured to perform wireless communication with the controller 20 to receive a remote control signal from the controller 20.

Controller 20

The controller 20 has a function of manipulating the unmanned flight vehicle 10. The controller 20 includes: an operation unit 21, which is used for a user to manipulate the flight vehicle 10, etc.; a control unit 22, which is used for controlling the action of the controller 20; a storage unit 23, which is used for pre-storing a control program and the like executed by the microcomputer of the control unit 22; a wireless communication unit 24, which is used for performing wireless communication with the flight vehicle 10; and an image display unit 25, which is used for displaying a predetermined image to the user.

The wireless communication unit 24 is configured to perform wireless communication with the controller 10 to send a remote control signal to the flight vehicle 10.

The image display unit 25 may be integrated with a manipulation device that controls the flight vehicle 10 or may be separate from the manipulation device. If the image display unit 25 is integrated with the manipulation device, the number of devices used by the user can be reduced, and the convenience can be improved. In a case that the image display unit 25 is separate from the manipulation device, the image display unit 25 may be a portable terminal device such as a smartphone or a tablet terminal that can be wirelessly connected to the wireless communication unit 19 of the flight vehicle 10. The case that the image display unit 25 is separate from the manipulation device has an advantage that the existing operating device without the image display unit 25 can be adopted.

Computer 30

The computer 30 has following functions: multiple images captured by the camera 17 are synthesized to generate a long image; and a capturing timing of the camera 17 for generating the long image is set. The computer 30 has: an input unit 31, which is use for the user to input command information and the like; a control unit 32, which is used for controlling the action of the computer 30; a storage unit 33, which is used for pre-storing a control program executed by the microcomputer of the control unit 32 and the like; and an image display unit 34, which is used for displaying a predetermined image to the user.

The control unit 32 reads a predetermined program, thereby implementing a data acquisition module 321, a time interval setting module 322, a shutter updating module 323, an image amount determination module 324, and a long image generation module 325. The time interval setting module 322 is used to set a time interval for capturing a plurality of images for generating a long image, and the time interval changes in accordance with the moving speed of the moving vehicle and the view angle of the camera 17.

The storage unit 33 has: an information storage region 331, which is used for storing information related to the time interval used in the above-mentioned time interval setting module 322; and an image data storage region 332, which is used for storing the image data transferred through a portable recording media such as a USB memory and a SD card and stored in the storage unit 18 of the flight vehicle 10.

Flowchart of a Long Image Generation Method Using the Long Image Generation System 1

Figure 2:
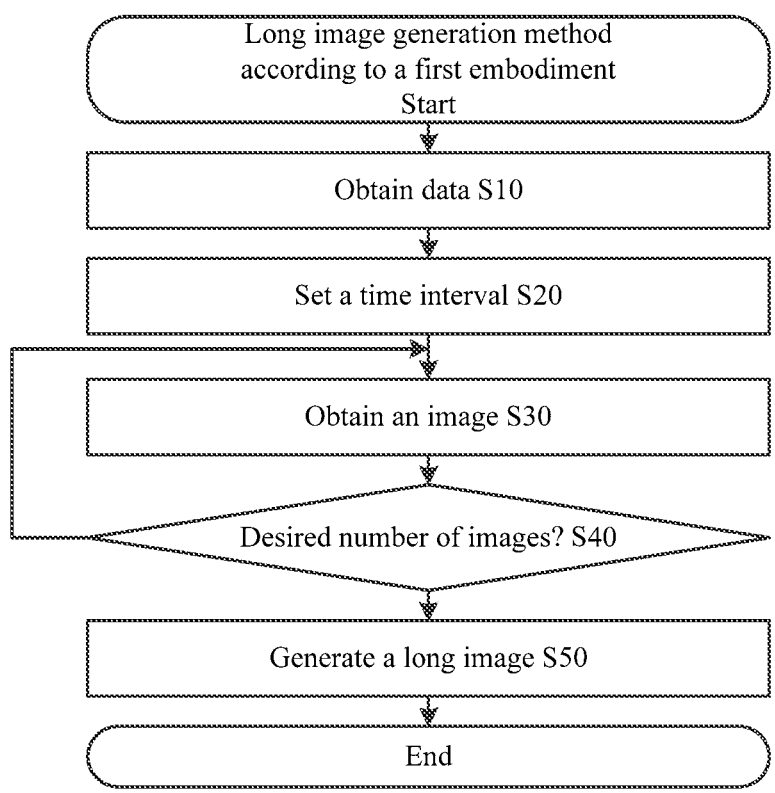
FIG. 2 is a flowchart of a long image generation method using the long image generation system 1 according to the first embodiment.

FIG. 2 is a flowchart of a long image generation method using the long image generation system 1 according to the first embodiment. The processing performed by the above-mentioned hardware and software modules will be described.

In step S10, moving vehicle information/camera setting information is obtained.

First, the control unit 32 of the computer 30 of the long image generation system 1 executes the data acquisition module 321 to obtain current information related to the moving vehicle and information related to the setting value of the camera 17. Specifically, the moving speed of the moving vehicle is obtained as information related to the moving vehicle, and the view angle of the camera 17 is obtained as information related to the setting value of the camera 17. Here, when the moving vehicle is the flight vehicle 10, the flight altitude of the flight vehicle 10 is also obtained.

In step S20, a time interval is set.

Then, the control unit 32 of the computer 30 executes the time interval setting module 322. When the time interval setting module 322 is executed, the information storage region 331 is read, and the time interval is set in accordance with the information of the moving vehicle and the setting information of the camera 17 which are obtained in step S10. Specifically, a time interval, which is preset corresponding to the moving speed of the moving vehicle and the view angle of the camera, is set. Here, the time interval refers to an interval of time for obtaining an image by opening the shutter of the camera 17 in the closed state.

The relationship of the time interval for obtaining images with the moving speed of the moving vehicle and the view angle of the camera is pre-stored in the information storage region 331, the relationship being obtained by setting the shutter of the camera 17 to be open. Specifically, the faster the moving vehicle moves, the shorter the time interval is; the wider the view angle of the camera is, the longer the time interval is. In step S20, the time interval stored in the information storage region 331 is read based on the moving speed of the moving vehicle and the set value of the view angle of the camera and is set as the time interval for obtaining the images.

Here, the setting of the time interval in a case where the moving vehicle is the flight vehicle 10 will be specifically described with reference to FIG. 3.

As shown in FIG. 3, the relationship of the view angle of the camera 17, the flight altitude of the flight vehicle 10, the moving speed of the flight vehicle 10 and the time interval for setting the shutter of the camera 17 to the open state is pre-stored in the information storage region 331.

FIG. 3 (a) shows the change of the time interval in a case where the view angle and the moving speed are fixed and the flight altitude is changed. As the flight altitude becomes higher, the time interval for setting the shutter to the open state becomes longer. Since the higher the flight altitude is, the wider the region of the image captured by the camera 17 is.

FIG. 3 (b) shows the change of the time interval in a case where the view angle and the flight altitude are fixed and the moving speed is changed. As the moving speeder becomes faster, the time interval for setting the shutter to the open state becomes shorter. Since the faster the moving speed is, the faster the region captured by the camera 17 moves.

FIG. 3 (c) shows the change of the time interval in a case where the flight altitude and the moving speed are changed as FIG. 3 (a) and only the view angle is changed. The flight altitude becomes higher, the time interval for setting the shutter to the open state becomes longer. In a case of the same flight altitude and the same moving speed, the larger the view angle is, the wider the region captured by the camera 7 is.

In this way, the time interval for obtaining the images is set based on the relationship of the time interval to the information of the moving vehicle and the setting information of the camera 17 which are pre-stored in the information storage region 331.

In step S30, the image is obtained.

Multiple images are obtained by setting the shutter of the camera 17 from the closed state to the open state at each time interval set in step S20. In this case, the shutter temporarily in the open state is set to: maintain the open state based on the shutter updating module 323 for a predetermined time, and then be closed. Then, after the time interval set in step S20 elapses, the shutter is again opened to obtain an image. The image obtained in this manner, the date and time of capturing, and the setting value of capturing including the setting value of the view angle of are together stored in the image data storage region 332 of the computer 30.

In step S40, whether a desired number of images has been obtained is determined.

Then, the image amount determination module 324 in the control unit 32 of the computer 30 is executed, and if it is determined that the desired number of images has been obtained, the obtaining of the image is ended, and the process goes to step S50 to generate a long image. On the other hand, if it is determined that the desired number of images has not been obtained, the process returns to step S30, and an image is further obtained after the set time interval elapses. The above processing is repeated until the desired number of images have been obtained.

In step S50, a long image is generated.

If the desired number of images can be captured, the control unit 32 of the computer 30 executes the long image generation module 325. The long image generation module 325 is configured to synthesize the images stored in the image data storage region 332 to generate a long image. In this case, by making the obtained images overlapped end-to-end, the desired long image can be generated. When the processing of step S50 is terminated, the long image generation system 1 terminates a series of processing of the long image generation method in the first embodiment.

Figure 4:
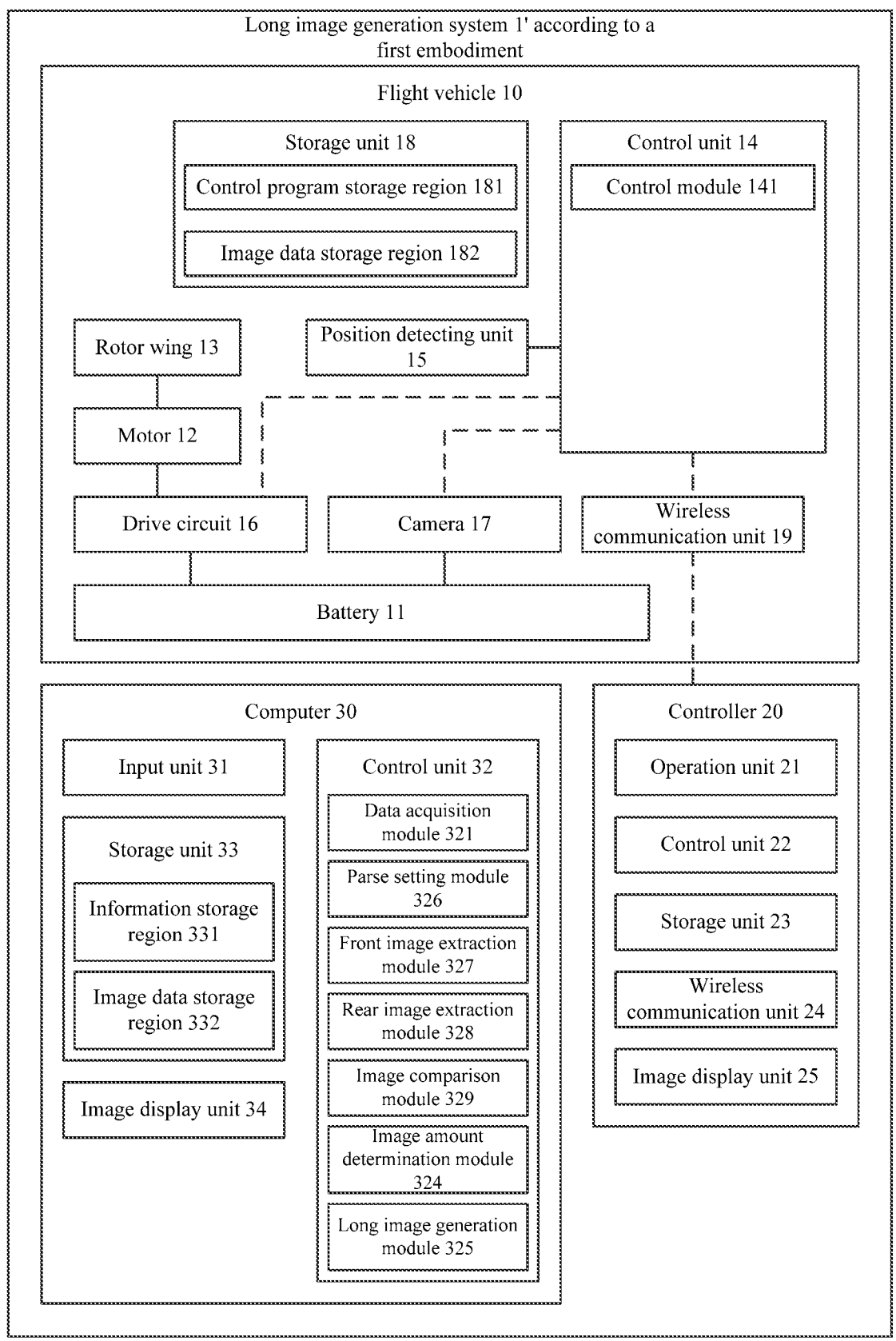
FIG. 4 is a block diagram showing a hardware configuration and software functions of a long image generation system 1' based on a moving vehicle according to a second embodiment.

Composition of a Long Image Forming System 1' According to the Second Embodiment FIG. 4 is a block diagram of a hardware configuration and software functions of a long image generation system 1' according to a second embodiment of the present disclosure. The long image generation system 1' according to the second embodiment is similar to the long image generation system 1 according to the first embodiment, and the long image generation system 1' includes: a flight vehicle 10, a camera 17, a controller 20, and a computer 30. In the present embodiment, the flight vehicle 10 is described as an example of the moving vehicle, but the moving vehicle may be a moving vehicle moving on the ground. Hereinafter, only the difference from the long image generation system 1 in the first embodiment will be described in detail.

In the long image generating system 1' according to the second embodiment, the control unit 32 of the computer 30 includes a parse setting module 326, which replaces the time interval setting module 322 according to the first embodiment. The control unit 32 of the computer 30 further includes: a front image extraction module 327, a rear image extraction module 328, and an image comparison module 329. The parse setting module 326, which is the same as the time interval setting module, is used to set the time interval for capturing a plurality of images for generating a long image, and the time interval changes in accordance with the moving speed of the moving vehicle and the view angle of the camera 17.

Flowchart of a Long Image Generation Method Using the Long Image Generation System 1'

Figure 5:
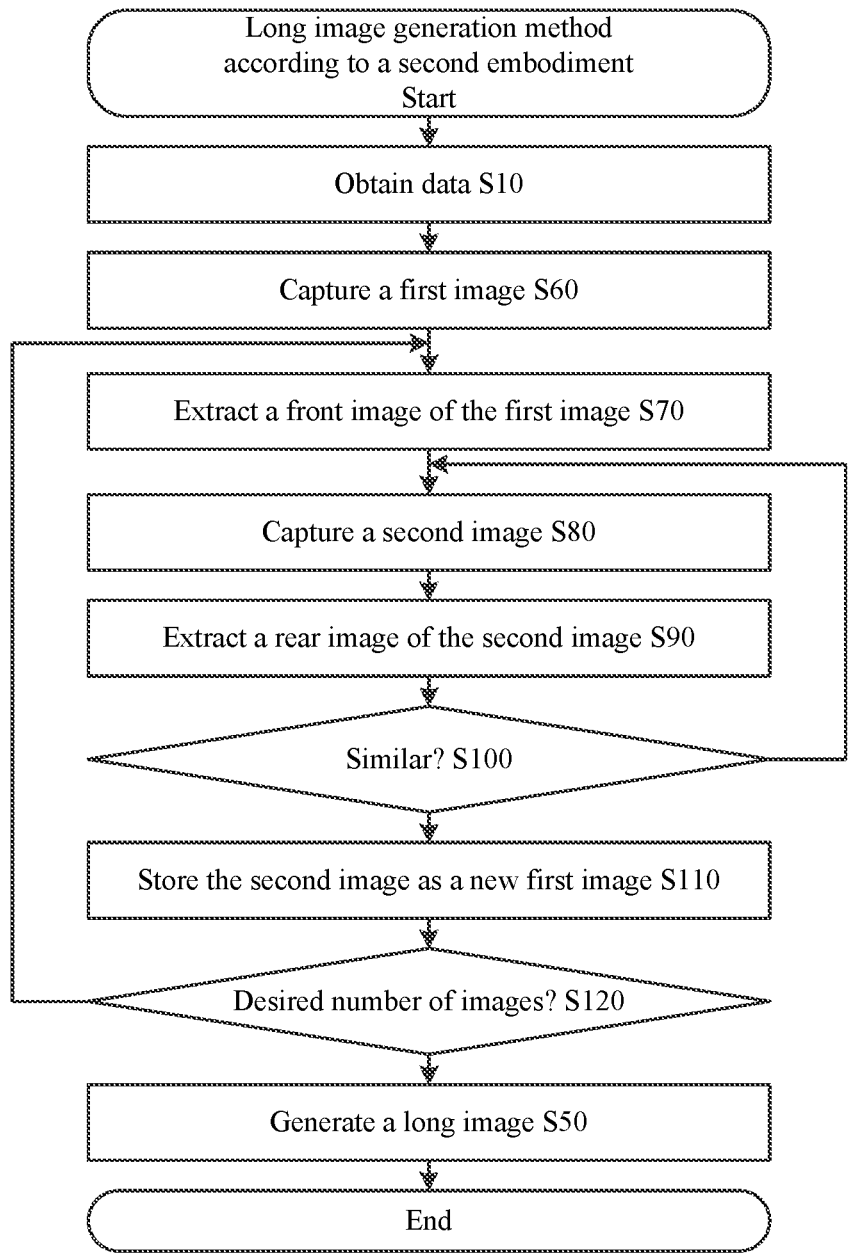
FIG. 5 is a flowchart of a long image generation method using the long image generation system 1' according to the second embodiment.
Figure 6:
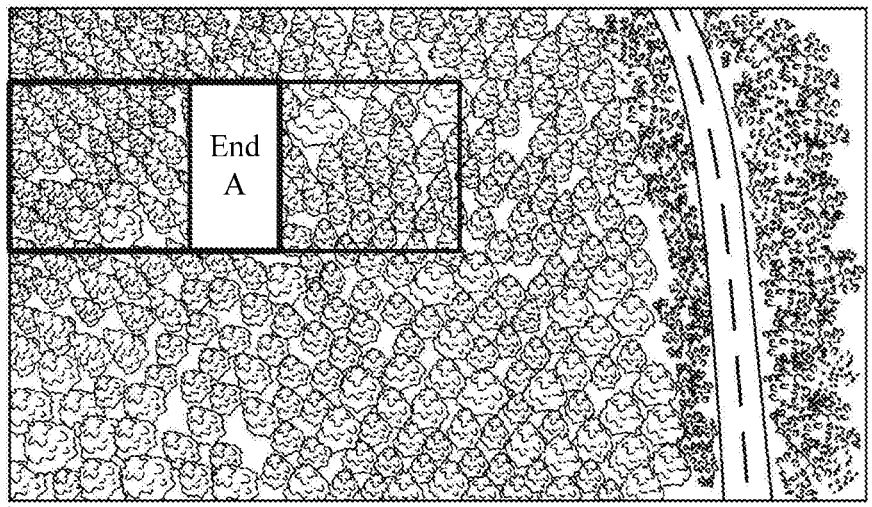
FIG. 6 is a schematic diagram showing an image obtaining algorithm in the second embodiment in the case where a moving direction and an expanding direction of a panoramic image are parallel.

Next, a long image generation method using the long image generation system 1' according to the second embodiment of the present disclosure will be described with reference to the flowchart of FIG. 5. FIG. 6 is a schematic diagram of an image obtaining algorithm in the second embodiment.

In step S10, moving vehicle information/camera setting information is obtained.

First, the control unit 32 of the computer 30 of the long image generation system 1' executes the data acquisition module 321 to obtain current information related to the moving vehicle and current information related to the setting value of the camera 17. Specifically, the moving speed of the moving vehicle is obtained as information related to the moving vehicle, and the view angle of the camera 17 is obtained as information related to the setting value of the camera 17. Here, when the moving vehicle is the flight vehicle 10, the flight altitude of the flight vehicle 10 is also obtained.

In step S60, a first image is captured.

Then, an image is captured by the camera 17 at a predetermined timing (a first timing), and the captured image is stored in the image data storage region 332 as the first image.

In step S70, a front image of the first image is extracted.

The front image extraction module 327 is executed to extract the front image occupying a predetermined region toward a moving direction of the first image, and store the front image in the image data storage region 332 as a front image A in the first image.

In step S80, a second image is extracted.

Then, at a second timing later than the first timing, an image is captured by the camera 17 and the image is set as a second image.

In step S90, a rear image of the second image is extracted.

Next, the rear image extraction module 328 is executed to extract a rear image occupying a predetermined region opposite to the moving direction of the second image.

In step S100, the front image of the first image is compared with the rear image of the second image.

Next, the image comparison module 329 is executed to compare the front image A in the first image with the rear image in the second image, and determine whether an overlapping degree of the two images is greater than a predetermined degree.

In step S110, the second image is obtained.

In step S100, in a case where the overlapping degree is greater than the predetermined degree, the process goes to step S110, and the second image is stored in the image data storage region 332 as a new first image.

On the other hand, in step S100, in a case where the overlapping degree is less than the predetermined degree, the process returns to step S80, after a short period of time, a second image is captured again, and the extraction of the rear image in step S90 and step S100 and the comparison of the front image of the first image are performed. This process is repeated until the overlapping degree of the front image A in the first image and the rear image in the second image is greater a predetermined degree, thereby obtaining the second image.

In step S120, whether a desired number of images has been obtained is determined.

In step S110, when the second image is obtained, the process proceeds to step S120, and the image amount determination module 324 in the control unit 32 of the computer 30 is executed. In a case where the desired number of images has been obtained, the image obtaining is ended, and the process goes to step S50 to generate a long image. On the other hand, in a case where the desired number of images has not been obtained, the process returns to step S70, and the process for obtaining the second image is executed again. In this way, the processing of storing the second image is repeated until a desired number of images is obtained.

Figure 7:
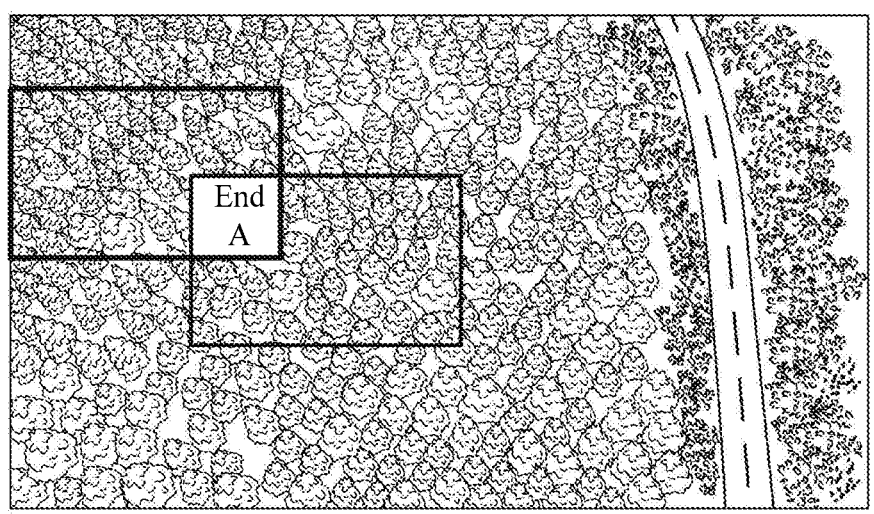
FIG. 7 is a schematic diagram showing an image obtaining algorithm in the second embodiment in the case where a moving direction and an expanding direction of a panoramic image are not parallel.

The schematic diagram in FIG. 6 shows a case where the moving direction and an expanding direction of a panoramic image are parallel; but as shown in FIG. 7, in a case where the moving direction and the expanding direction of a panoramic image are not parallel, a same algorithm will be used to determine the timing of capturing. In this case, the panoramic image is an image that does not extend in a width direction of the image but extends in the moving direction.

According to this embodiment of the present disclosure, the image data storage region 332 obtains images and stores the images at time intervals, where the time intervals change according to the view angle of the camera 17 carried by the moving vehicle and the moving speed of the moving vehicle. Then, the long image generation module 325 is configured to synthesize the images stored in the image data storage region 332 to generate a long image. Therefore, the time intervals for obtaining the images can be appropriately adjusted according to the view angle of the imaging device carried by the moving vehicle and the moving speed of the moving vehicle. Even when the moving vehicle moves linearly in a certain direction and the moving vehicle and an imaging object are separated by a predetermined distance or more, a continuous long image can be generated through obtaining as few images as possible.

In addition, in the embodiment of the present disclosure, when the moving vehicle is the flight vehicle 10, the images are obtained and stored at time intervals changing in accordance with, in addition to the view angle of the camera 17 and the moving speed of the moving vehicle, the flight altitude of the flight vehicle 10. Then, the long image generation module 325 is configured to synthesize the images stored in the image data storage region 332 to generate a long image. Therefore, even in a case where the flight vehicle and the imaging object are separated by a predetermined distance or more, a continuous long image can be generated by obtaining as few images as possible.

In addition, the storage unit 33 of the embodiment of the present disclosure also includes: an information storage region 331, which is user for pre-storing information of a relationship of the time interval of capturing to the view angle of the camera 17 and the moving speed of the moving vehicle; and a shutter updating module 323, which is used for setting, according to the information stored in the information storage region 331, a shutter of the camera 17 from a closed state to an open state at the time intervals set by the time interval setting module 322, which is used for setting the time intervals corresponding to the view angle of the camera 17 and the moving speed of the moving vehicle, and setting the shutter form the closed state to the open state after a predetermined period; the image data storage region 332 obtains the images obtained when the shutter is in the open state and stores the images. The time intervals for setting the shutter to the open state and obtaining the plurality of images can be appropriately adjusted according to the information stored in the information storage region 331. Therefore, even when the moving vehicle moves linearly in a certain direction, and the moving vehicle and the imaging object are separated by a predetermined distance or more, a continuous long image can be generated through obtaining a further fewer images.

In addition, the control unit 32 of the embodiment of the present disclosure, for capturing the first image at the first timing and capturing the second image at the second timing later than the first timing, further include: an image comparison module 329, which is configured to determine whether an overlapping degree of a front image occupying a predetermined region in a moving direction of the first image and a rear image occupying a predetermined region in a direction opposite to the moving direction of the second image is equal to or greater than a predetermined degree; in a case where the overlapping degree is equal to or greater than the predetermined degree, the image data storage region 332 accumulatively stores the second image, the second image is set as the first image, and the capturing of the second image and the determination of the image comparison module 329 are repeated, and in a case where the overlapping degree is less than the predetermined degree, the capturing of the second image and the determination of the image comparison module 329 are performed again. Therefore, only in a case where the overlapping degree of the front image occupying the predetermined region in a movement direction of the first image and the rear image occupying the predetermined region in a direction opposite to the movement direction of the second image is greater than the predetermined degree, the image is stored in the image storage unit. Therefore, even when the moving vehicle moves linearly in a certain direction, and the moving vehicle and the imaging object are separated by a predetermined distance or more, a continuous long image can be generated through obtaining a further fewer images.

The above-mentioned units and functions are implemented by a computer (including a CPU, an information processing device, and various terminals) reading and executing a predetermined program. The program is provided in a form of a computer-readable recording medium such as a floppy disk, CD (CD-ROM, etc.), DVD (DVD-ROM, DVD-RAM, etc.), and the like. In this case, the computer reads the program from the recording medium, transfers the program to an internal storage device or an external storage device, stores and executes the program. In addition, the program may be pre-recorded on a storage device (recording medium) such as a magnetic disk, an optical disk, a magneto-optical disk and the like, and the program is provided from the storage device to a computer via a communication line.

As mentioned above, although the embodiments of the present disclosure are described, this disclosure is not limited to these embodiments mentioned above. In addition, the effects described in the embodiments of the present disclosure are merely lists of the most preferable effects produced by the present disclosure, and the effects of the present disclosure are not limited to the effects described in the embodiments of the present disclosure.

LIST OF REFERENCE NUMBERS 1, 1': Long image generation system
10: Flight vehicle
11: Battery
12: Motor
13: Rotor wing
14: Control unit
15: Position detecting unit
16: Drive circuit
17: Camera
18: Storage unit
19: Wireless communication unit
20: Controller
30: Computer
31: Input unit
32: Control unit
321: Data acquisition module
322: Time interval setting module
323: Shutter updating module
324: Image amount determination module
325: Long image generation module
326: Parse setting module
327: Front image extraction module
328: Rear image extraction module
329: Image comparison module
33: Storage unit
331: Information storage region
332: Image data storage region
34: Image display unit.

What is claimed is:

1. A long image generation system, comprising an imaging device, a moving vehicle carrying the imaging device, and a computer, wherein the long image generation system is capable of synthesizing a plurality of images captured by the imaging device with movement of the moving vehicle to obtain a long image,
wherein the imaging device comprises:
an imaging unit, which is configured to capture a first image at first timing and capture a second image at second timing later than the first timing;
wherein the computer comprises:
an image storage unit, which is configured to obtain the plurality of images at time intervals and store the plurality of images, wherein the time intervals change according to a view angle of the imaging device and a moving speed of the moving vehicle; and
a determination unit, which is configured to determine whether an overlapping degree of a front image occupying a predetermined region in a moving direction of the first image and a rear image occupying a predetermined region in a direction opposite to the moving direction of the second image is equal to or greater than a predetermined degree;
a long image generation unit, which is configured to synthesize the plurality of images stored in the image storage unit to generate a long image,
wherein in a case where the determination unit determines that the overlapping degree is equal to or greater than the predetermined degree, the image storage unit is configured to at least accumulatively store the second image; wherein the second image is taken as the first image, capturing of the second image and determination are repeated; and wherein in a case where the determination unit determines that the overlapping degree is less than the predetermined degree, the second image is captured again and determination of the determination unit is performed again.

2. The long image generation system of claim 1, wherein the moving vehicle is a flight vehicle, and
the image storage unit is configured to obtain the plurality of images at the time intervals, wherein the time intervals change according to the view angle of the imaging device, the moving speed of the flight vehicle, and altitude of the flight vehicle.

3. The long image generation system of claim 1, wherein the computer further comprises:
an information storage unit, which is configured to pre-store information indicating a relationship of the time intervals to the view angle of the imaging device and to the moving speed of the moving vehicle;
a time interval setting unit, which is configured to set the time intervals corresponding to the view angle of the imaging device and the moving speed of the moving vehicle based on the information stored in the information storage unit;
a shutter updating unit, which is configured to, according to the time intervals set by the time interval setting unit, set a shutter of the imaging device from a closed state to an open state, and set the shutter from the open state to the closed state after a predetermined period;
wherein the image storage unit is configured to obtain the plurality of images obtained when the shutter is in the open state and store the plurality of images.

4. A long image generation method, executed by a long image generation system comprising an imaging device, a moving vehicle carrying the imaging device and a computer, wherein the method comprises:
capturing, by the imaging device, a first image at first timing, and capturing a second image at second timing later than the first timing;
obtaining, by a control device of the computer, a plurality of images at time intervals and storing the plurality of images in a predetermined storage region, wherein the time intervals change according to a view angle of the imaging device and a moving speed of the moving vehicle;
determining, by the control device, whether an overlapping degree of a front image occupying a predetermined region in a moving direction of the first image and a rear image occupying a predetermined region in a direction opposite to the moving direction of the second image is equal to or greater than a predetermined degree;
in response to determining that the overlapping degree is equal to or greater than the predetermined degree, at least accumulatively storing the second image, taking the second image as the first image, and repeating capturing of a second image and determination; and in response to determining that the overlapping degree is less than the predetermined degree, repeating capturing of a second image and determination; and
synthesizing, by the control device, the plurality of images stored in the predetermined storage region to generate a long image.

5. A non-transitory computer-readable storage medium having recorded thereon a computer-readable program, which is used for causing a long image generation system comprising
an imaging device, a computer and a moving vehicle carrying the imaging device to: in the imaging device; capture a first image at first timing and capture a second image at second timing later than the first timing; in the computer; obtain a plurality of images at time intervals and store the plurality of images, wherein the plurality of time intervals change according to a view angle of the imaging device and a moving speed of the moving vehicle; determine whether an overlapping degree of a front image occupying a predetermined region in a moving direction of the first image and a rear image occupying a predetermined region in a direction opposite to the moving direction of the second image is equal to or greater than a predetermined degree; in response to determining that the overlapping degree is equal to or greater than the predetermined degree, at least accumulatively store the second image, take the second image as the first image, and repeat capturing of a second image and determination; and in response to determining that the overlapping degree is less than the predetermined degree, repeat capturing of a second image and determination; and synthesizing the stored images to generate a long image.

* * * * *